United States Patent [19]

Beshore et al.

[11] Patent Number: 4,762,527
[45] Date of Patent: Aug. 9, 1988

[54] SLURRY FUEL COMPRISED OF A HEAT TREATED, PARTIALLY DEWATERED SLUDGE WITH A PARTICULATE SOLID FUEL AND ITS METHOD OF MANUFACTURE

[75] Inventors: David G. Beshore, St. Petersburg; Vincent M. Giampa, Apollo Beach, both of Fla.

[73] Assignee: Electric Fuels Corporation, St. Petersburg, Fla.

[21] Appl. No.: 942,412

[22] Filed: Dec. 16, 1986

[51] Int. Cl.$^4$ .............................................. C10L 1/32
[52] U.S. Cl. ........................................... 44/51; 44/50; 44/605; 110/346
[58] Field of Search ................. 44/51, 50, 1 D; 110/346; 210/2

[56] References Cited

U.S. PATENT DOCUMENTS

| | | | |
|---|---|---|---|
| 2,423,913 | 7/1947 | Vose | 44/51 |
| 3,166,032 | 1/1965 | Klesper | 110/10 |
| 3,296,122 | 1/1967 | Karassik et al. | 210/2 |
| 3,620,698 | 11/1971 | Schlinger et al. | 44/51 |
| 3,642,135 | 2/1972 | Borden | 210/97 |
| 3,660,054 | 5/1972 | Rieve | 44/1 R |
| 3,762,887 | 10/1973 | Clancey et al. | 44/51 |
| 4,104,035 | 8/1978 | Cole et al. | 44/51 |
| 4,135,888 | 1/1972 | Waltrip | 44/51 |
| 4,159,684 | 7/1979 | Kirkup | 44/1 D |
| 4,282,006 | 8/1981 | Funk | 44/51 |
| 4,405,332 | 9/1983 | Rodriguez | 44/51 |
| 4,416,666 | 11/1983 | Funk | 44/51 |
| 4,468,232 | 8/1984 | Funk | 44/51 |
| 4,477,259 | 10/1984 | Funk | 44/51 |
| 4,477,260 | 10/1984 | Funk | 44/51 |
| 4,479,806 | 10/1984 | Funk | 44/51 |
| 4,560,391 | 12/1985 | Ashworth | 44/51 |

FOREIGN PATENT DOCUMENTS

| | | |
|---|---|---|
| 55-94996 | 7/1980 | Japan . |
| 949000 | 5/1964 | United Kingdom . |

*Primary Examiner*—William R. Dixon, Jr.
*Assistant Examiner*—Margaret B. Medley
*Attorney, Agent, or Firm*—James W. Hellwege

[57] ABSTRACT

An improved pumpable fuel composition is provided comprising in major proportion a particulate solid fuel and in minor proportion sewage sludge, the improvement wherein said sewage sludge comprises from about 90 to 98 percent by weight of water and which sewage sludge has been subjected to heat treatment at a temperature in the range of from about 150° to 500° F. and subjected to pressures sufficient to both maintain the water content of the heat treated sewage sludge within the range of from about 90 to 98 percent by weight and to effect a lower viscosity for the sewage sludge upon return of the sewage sludge to ambient conditions. A method for the production of the improved fuel composition is also provided.

20 Claims, 6 Drawing Sheets

HEAT TREATMENT EFFECTS ON MIXTURE (50% COAL) VISCOSITY
60 MINUTES AT 240 DEGREES FAHRENHEIT

HEAT TREATMENT EFFECTS ON SLUDGE VISCOSITY
15 MINUTES AT 240 DEGREES FAHRENHEIT

FIG. 5

HEAT TREATMENT EFFECTS ON SLUDGE VISCOSITY
60 MINUTES AT 240 DEGREES FAHRENHEIT

FIG. 6

HEAT TREATMENT EFFECTS ON MIXTURE (50% COAL) VISCOSITY
60 MINUTES AT 240 DEGREES FAHRENHEIT

SLURRY FUEL COMPRISED OF A HEAT TREATED, PARTIALLY DEWATERED SLUDGE WITH A PARTICULATE SOLID FUEL AND ITS METHOD OF MANUFACTURE

BACKGROUND OF THE INVENTION

The present invention is directed to a fuel comprised of sewage sludge and a solid particulate fuel.

In an effort to reduce oil consumption due to volatile oil prices and questionable future sources of supply, industry has begun to convert from oil-fired boilers to boilers which are fired by alternative fuels such as particulate coal, coal-water and coal-oil mixtures. Admixtures of coal with suitable liquids such as water and oil are attractive as alternative fuels since such pumpable admixtures are relatively easily adapted for use with oil-fired boilers. This is contrast to the effort which is required to convert an oil-fired boiler to a coal-fired boiler. Exemplary disclosures of coal-water fuels are provided by U.S. Pat. No. 3,660,054 (issued to Rieve), U.S. Pat. No. 3,762,887 (issued to Clancey et al), U.S. Pat. No. 4,104,035 (issued to Cole et al), and U.S. Pat. Nos. 4,282,006; 4,416,666; 4,468,232; 4,477,259; 4,477,260; and 4,479,806 (each issued to Funk).

It is also known that alternative fuels may be comprised of a coal-sewage admixture which is processed prior to burning for various reasons such as to decrease the moisture content thereof, etc. See, for example, U.S. Pat. No. 3,166,032 (issued to Klesper); U.S. Pat. No. 4,135,888 (issued to Waltrip); U.S. Pat. No. 4,159,684 (issued to Kirkup) and British Pat. No. 949,000 (issued to Passavant et al). However, the production of such coal-sewage fuels requires significant processing and results in a substantially non-pumpable fuel which possesses the above-noted disadvantages of fuels comprised substantially of particulate coal.

It is also known to provide aqueous mixtures of sewage sludge which include a particulate fuel such as coal as exemplified by U.S. Pat. No. 4,405,332 (issued to Rodriguez et al) and Japanese patent publication No. 55-94996.

While such technology is generally acceptable, a need exists to modify the properties of the sewage sludge to enhance the physical characteristics of the ultimate admixture (e.g., the pumpability and stability of the admixture).

It would also be an advantage to provide an alternative fuel comprised of a solid fuel such as particulate coal and a relatively readily available waste material, such as sewage, which provides the advantages of pumpable coal-containing fuels while avoiding the disadvantages of substantially solid particulate fuels.

It would also be an advantage to provide an improved method for the disposal of sewage sludge which avoids the need for conventionally employed methods whereby the sewage sludge is treated and eventually discarded in landfills, etc. Such methods are costly, time-consuming and prevent valuable land from being used for more beneficial purposes.

OBJECTS AND SUMMARY OF THE INVENTION

It is therefore an object of the present invention to provide an improved combustible fuel.

It is still another object of the present invention to provide a pumpable combustible fuel which does not require the addition of extraneous water.

It is still yet another object of the present invention to provide a combustible fuel which can be readily adapted for use with existing oil-fired boilers.

It is still another object of the present invention to provide an improved method for the production of a pumpable sewage sludge-containing fuel exhibiting desirable viscosity characteristics.

In accordance with one aspect of the present invention, there is provided a pumpable fuel composition comprising in major proportion a particulate solid fuel and in minor proportion sewage sludge, the improvement wherein said sewage sludge comprises from about 90 to 98 percent by weight of water and which sewage sludge has been subjected to heat treatment at a temperature in the range of from about 150° to 500° F. while being maintained at a first pressure sufficient to maintain the water content of the heat treated sewage sludge within the range of from about 90 to 98 percent by weight, said first pressure at which said sewage sludge is maintained being reduced to a second pressure prior to permitting significant cooling of the heat treated sewage sludge with the pressure differential between said first and second pressures being sufficient to lower the viscosity exhibited by said heat treated sewage sludge at ambient conditions in comparison to that exhibited by the sewage sludge prior to said heat treatment.

In accordance with another aspect of the present invention, there is provided a method for the production of an improved pumpable fuel composition comprising in major proportion a particulate solid fuel and in minor proportion sewage sludge comprised of from about 90 to 98 percent by weight of water by the blending of said particulate solid fuel and said sewage sludge, the improvement comprising (1) subjecting said sewage sludge which comprises from about 90 to 98 percent by weight of water to a heat treatment at a temperature in the range of from about 150° to 500° F. while maintaining said sewage sludge at a first pressure sufficient to maintain the water content of the heat treated sewage sludge within the range of from about 90 to 98 percent by weight, and (2) reducing the pressure at which said sewage sludge is maintained from said first pressure to a second pressure without permitting significant cooling of said heat treated sewage sludge, the pressure differential between said first and second pressures being sufficient to lower the viscosity exhibited by said heat treated sewage sludge at ambient conditions in comparison to that exhibited by said sewage sludge prior to said heat treatment step.

DETAILED DESCRIPTION OF THE INVENTION

It has been surprisingly and unexpectedly found that the heat treatment of sewage sludge in a manner consistent with the present invention enables a pumpable fuel composition to be prepared comprised of the sewage sludge which exhibits highly advantageous physical characteristics.

The combustible fuel admixture of the present invention provides many advantages. For instance, sewage sludge is generally readily available and its use in such an admixture enables disposal problems to be simplified by avoiding the use of landfills and expensive purification processes. In addition, the use of sewage sludge containing significant amounts of water enables a pumpable fuel admixture to be provided which does not require the addition of extraneous water from other sources. It is therefore possible to conserve the increasingly valuable amount of water which is available for general consumption. Furthermore, additional sources of combustible materials (resulting in a higher BTU value for the fuel) are provided by use of the sewage sludge which compensates for the heat of vaporization disadvantageously withdrawn from the combustion process by the vaporization of the water present therein.

The combustible fuel of the present invention may be comprised of any suitable solid particulate fuel. The solid particulate fuel typically comprises a major proportion of the admixture, such as from about 45 to 75 percent by weight, and preferably comprises from about 50 to 65 percent by weight of the combustible fuel admixture.

The solid fuel which is employed can comprise coal of various types (anthracite, bituminous, sub-bituminous, lignite), petroleum coke, by-product coke, charcoal, humate, peat, wood or other suitable solid fuels. Mixtures of such fuels may also be employed. Coal is the preferred solid fuel. The above listing is not intended to be all-inclusive and one skilled in the art can determine which types of solids can be employed as the fuel component in the present invention.

The solid fuel is desirably processed to reduce the particle size thereof to a point that insures good fuel combustion and carbon conversion upon firing the fuel. The solid fuel size consist will generally be in the range of 100 wt% minus 8 mesh (2380 micrometers) to 100 wt% minus 325 mesh (44 micrometers). A typical size distribution for a solid fuel being of a size within the range cited above is shown in Table 1 below.

TABLE 1

| TYPICAL SOLID FUEL SIZE CONSIST | | |
|---|---|---|
| PARTICLE SIZE (Micrometers) | U.S. MESH | WT % LESS THAN |
| 420 | 40 | 99.4 |
| 297 | 50 | 97.2 |
| 149 | 100 | 81.2 |
| 74 | 200 | 52.6 |
| 44 | 325 | 31.9 |
| 37 | 400 | 28.9 |

The size distribution of the solid fuel is not critical and may vary widely. For example, the particle size distribution may either be uniformly distributed over the above range or concentrated at either end thereof. The pulverized particulate size consist can vary according to the particular fuel application and be adaptable to the economics of fuel production; i.e., in oil and gas designed boilers (100% less than 300 micrometers), coal designed boilers (100% less than 400 micrometers) and kilns (100% less than 600 micrometers).

The sewage sludge component of the fuel admixture of the present invention typically comprises a minor proportion of the admixture, such as from about 25 to 55 percent by weight, and preferably comprises from about 35 to 50 percent by weight of the fuel admixture. The sewage sludge generally consists of from about 90 to 98 percent by weight of water and from about 2 to 10 percent by weight of combustible or volatile solids. Preferably, the sewage sludge comprises from about 92 to 97 percent by weight of water. Such sewage sludge comprises, in essence, sludge which has not been dewatered to any significant extent.

Sewage sludge is the mixture of sewage (i.e., contaminated water) and settled solids. As a result of the type of treatment received, it may be designated as raw or fresh, digested, activated, dewatered, or dried. Other descriptive terms include elutriated, Imhoff, and septic tank sludge.

Figure 1:
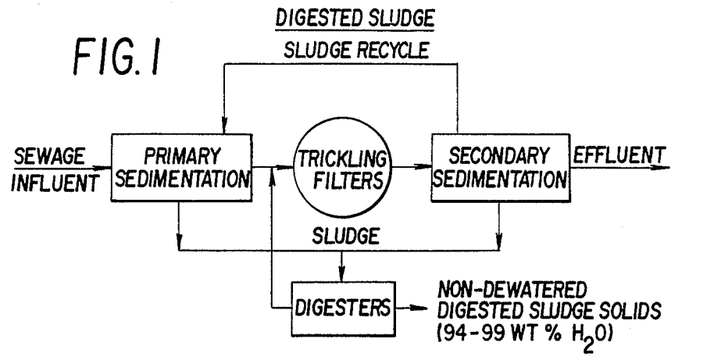
FIGS. 1-3 depict schematically various conventional methods for the treatment of raw sewage.
Figure 2:
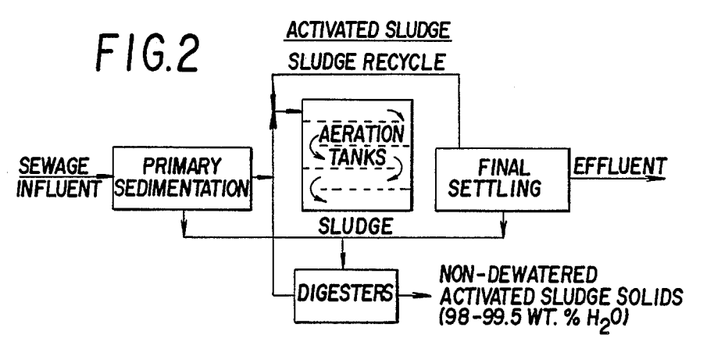
Figure 3:
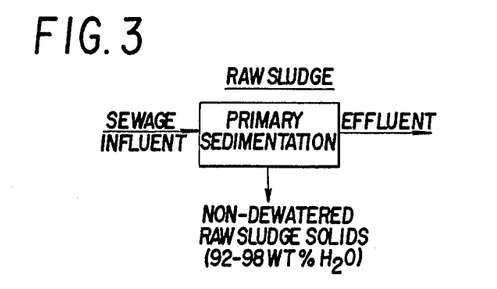

The present invention concerns primarily the utilization of sludge of relatively high water content. Therefore, the sludge to be admixed with the solid fuel would, in most cases, be raw, digested, or activated sludge. However, there may be situations where it could be efficacious to mix water with dewatered or dried sludge in order to dispose of the sludge (in a substantially "non-dewatered" form) by the method of the present invention. A typical flow diagram depicting conventional methods for the production of raw, digested, or activated sludge solids is shown in FIGS. 1, 2 and 3.

Raw sludge solids are produced by plain sedimentation. Digested and activated sludge solids are produced from the secondary treatment of sewage. The digested and activated sludge treatment processes both depend on aerobic biological organisms to effect decomposition. The only difference between the two processes is the method of operation. Digested sludge treatment employs trickling filters wherein the organisms attach themselves to the filters and the organic material (sewage) is pumped through the organism for the digestion process. In the activated sludge treatment process, the organisms are migrant and are thoroughly mixed with the organic matter to effect digestion.

The quantity and composition of sludge varies with the character of the sewage from which it is removed. It also is dependent on the type of treatment that it receives. Typical concentrations and analyses of the solids for various sewage sludges are shown in Table 2.

TABLE 2
CONCENTRATION AND ANALYSIS OF VARIOUS TYPES OF SLUDGE SOLIDS

| CONSTITUENT, WT % | RAW | DI-GESTED | ACTIVATED |
|---|---|---|---|
| Solids, Total | 5-10 | 5-15 | 0.5-2 |
| Solids, Dry Basis: | | | |
| Volatile Matter | 55-80 | 40-60 | 62-75 |
| Ash | 20-45 | 40-60 | 25-38 |
| Insoluble Ash | 15-35 | 30-50 | 22-30 |
| Grease and Fats | 5-35 | 2-17 | 5-12 |
| Protein | 20-28 | 14-30 | 32-41 |
| Ammonium Nitrate | 1-3.5 | 1-4 | 4-7 |
| Phosphoric Acid | 1-1.5 | 0.5-3.7 | 3-4 |
| Potash | | 0-4 | 0.86 |
| Cellulose | 8-13 | 8-13 | 7.8 |
| Silica | | 15-16 | 8.5 |
| Iron | | 5.4 | 7.1 |

Gross Heating Value, 7250 BTU/LB (dry basis)

It has been surprisingly and unexpectedly found that the viscosity and yield points off sewage sludge (as hereinafter defined) can be significantly modified by the heat treatment of the sludge under specific conditions of temperature and pressure which also minimize both a decrease in the water content of the sludge and a corresponding increase in the solids content of the sludge. Such heat treatment, while not eliminating the "plastic" characteristics exhibited by sewage sludge, does result in the lowering of the yield points of the sludge which promotes easier handling and pumping of the improved fuel composition.

By way of background, the accepted definition of viscosity is as follows:

$$\frac{g_c \cdot \tau}{(du/dy)} = \frac{g_c \cdot \tau}{D}$$

where
u = fluid viscosity (pascal second)
$\tau$ = shear stress (Newton/m$^2$)
$g_c$ = dimensional constant (1.0 kgm/NS$^2$)
du/dy = velocity gradient (sec$^{-1}$)
D = shear rate (du/dy (sec$^{-1}$))

Non-newtonian fluids are usually divided into three classes; i.e., (1) viscosity time-independent under shear, (2) viscosity time dependent under shear and (3) viscoelastic fluids.

Viscosity time-independent under shear fluids include Bingham plastic fluids (ketchup), pseudoelastic materials (polymers) and dilatant materials (highly loaded suspensions).

Viscosity time dependent under shear fluids include thixotropic fluids whose viscosity decreases with time at shear (mayonnaise, drilling muds, paints, inks), and rheopectic materials whose viscosity increases under shear (bentonite soda, gypsum suspensions in water).

Viscoelastic fluids (polymeric fluids, solid propellants) exhibit the characteristics of solids.

The coal/sludge compositions of the present invention are advantageously thixotropic in nature yet behave as Bingham plastics due to their initial yield stress characteristics.

The sewage sludge heat treatment conditions employed include temperatures in the range of from about 150° to 500° F., preferably from 200° to 500° F., and most preferably from about 220° to 300° F. The heat treatment will generally be undertaken for a time period within the range of from about 1 to 120 minutes, and preferably from about 15 to 60 minutes.

During the heat treatment step the sewage sludge is initially maintained at a pressure sufficient to maintain the water content of the resulting heat treated sewage sludge within the range of from about 90 to 98 percent by weight. Preferably, the pressure at which the sewage sludge is initially maintained is sufficient to minimize and/or inhibit loss of water from the sludge during heat treatment such that the water content of the sewage sludge remains substantially unchanged. Such pressure will generally be in the range of from about 5 to 700 psig and preferably from about 5 to 20 psig. Loss of water can be minimized by the use of elevated pressures as well as the optional use of a steam-containing atmosphere during the heat treatment step.

Preferably, the increase in solids content of the sewage sludge as a result of the heat treatment should not exceed about 30 percent, based on the solids content of the sludge prior to the heat treatment. In any event, the increase in solids content, if any, should be minimized so that the water content of the heat treated sewage sludge remains within the range of from about 90 to 98 percent by weight.

It has been discovered that the treatment of the sewage sludge in a manner consistent with the present invention may result in a 35 to 70 percent reduction in viscosity of the sludge when measured at high shear rates (e.g., at about 80° F. and 100 sec$^{-1}$), with the actual viscosity reduction which is achieved being dependent upon the heat treatment and pressure conditions employed and the physical characteristics of the sewage sludge which is treated. However, it is preferable for the viscosity of the sludge to be reduced by at least about 40 percent in order to optimize the advantages to be gained by the present invention.

Such viscosity reduction is achieved by maintaining the sewage sludge at a first pressure during the heat treatment step. Subsequent to the heat treatment step, the pressure at which the sewage sludge is maintained is reduced to a second pressure without permitting significant cooling of the heat treated sewage sludge. The pressure differential between the first and second pressures is such that the viscosity exhibited by the heat treated sewage sludge at ambient conditions is lowered in comparison to that exhibited by the sewage sludge prior to the heat treatment step.

While not wishing to be bound by any theory, it is believed that the viscosity of the sewage sludge is reduced as a result of the heating of the sewage sludge under pressure in conjunction with the subsequent providing of a pressure differential which causes water present in the cell walls of cellular matter present in the sludge to be released quickly, thus rupturing the cell walls. Such rupturing of cellular matter is accordingly believed to enable the viscosity of the sewage sludge to be lowered in comparison to that normally exhibited by the non-treated sewage sludge. It is thus necessary for the pressure differential which is caused to exist to be of sufficient magnitude to provide the desired viscosity reduction. Surprisingly, the magnitude of the pressure differential need not be large. It has been found that a pressure differential of only about 10 psi (and preferably less than about 20 psi) can result in significant reductions in the viscosity of the sewage sludge. It is of course possible that merely releasing the pressure and permitting the sewage sludge to return to ambient pressure will result in the requisite pressure differential.

Such a consequence is preferred from the practical standpoint.

A negative pressure could also be applied to the heat treated sludge to yield the requisite pressure differential subsequent to the sewage sludge having been maintained at a higher first pressure during the heat treatment of the sludge. Such an embodiment may be of use when the first pressure at which the sludge is maintained is relatively low. The subsequent application of a negative pressure enables the pressure differential which is formed to be of sufficient magnitude to enhance the resulting viscosity reduction. The sludge could then be returned to atmospheric pressure once the sludge had been subjected to such pressure differential, resulting in a reduction in the viscosity of the sludge.

While the specific pressure differential which will provide the desired viscosity reduction will vary which regard to the composition of the sewage sludge to be treated, the heat treatment temperature employed and the pressure under which the sewage sludge is first maintained, it is believed that the objects of the present invention can be achieved if the pressure differential ranges from about 5 to about 20 psi. It is important to avoid use of a pressure differential which will result in the occurrence of flash vaporization as such a consequence would serve to disadvantageously reduce the water content of the sewage sludge.

It is also important to avoid significant cooling of the heat treated sewage sludge prior to providing the noted pressure differential. The extent of the rupturing of the walls of the cellular material present in the sewage sludge upon reduction of the pressure at which the sludge is first maintained will disadvantageously be avoided if the temperature of the heat treated sewage sludge is reduced significantly prior to the subsequent pressure reduction. It is thus preferable for the temperature of the heat treated sewage sludge to be substantially maintained at the heat treatment temperature during the reduction of the pressure at which the sludge was originally maintained during the heat treatment. The temperature of the heat treated sludge should preferably not be permitted to decrease more than about 20° F. prior to or during said pressure reduction step. Of course, once the pressure has been reduced, the sewage sludge may be permitted to cool to ambient temperature prior to admixing same with the particulate fuel or the sewage sludge may be admixed with the particulate fuel while still at an elevated temperature.

Experiments were conducted to demonstrate the effect of heat treatment upon the viscosity characteristics of sewage sludge employing a temperature of 240° F. and a pressure of 11 psig for time periods of 15 and 60 minutes.

While in each instance the heat treated sewage sludge was heat treated by itself, certain viscosity experiments were also conducted using compositions comprised of equal parts particulate coal and sewage sludge (either heat treated or non-heat treated). A Haake Rotovisco RV2 high temperature rotational viscometer was employed to determine the relationship between the stress (i.e., response) and shear rate (stimulus) of such compositions.

The results of these experiments (for both increasing and decreasing shear) are summarized in Tables 3, 4 and 5 below and depicted in FIGS. 4, 5 and 6:

TABLE 3

15 MINUTE SLUDGE HEAT TREATMENT EFFECT UPON SLUDGE VISCOSITY

| Raw Digested Sludge | | | Heat Treated Sludge | | |
|---|---|---|---|---|---|
| Shear Stress (Pascals) | Shear Rate (Sec$^{-1}$) | Viscosity (CP) | Shear Stress (Pascals) | Shear Rate (Sec$^{-1}$) | Viscosity (CP) |
| Increasing Shear | | | Increasing Shear | | |
| 23.9 | 0 | Yield Point | 11.9 | 0 | Yield Point |
| 30.8 | 87.9 | 350.1 | 18.8 | 87.9 | 213.9 |
| 34.2 | 175.8 | 194.5 | 22.6 | 175.8 | 128.4 |
| 37.6 | 263.7 | 142.6 | 24.9 | 263.7 | 94.7 |
| 40.4 | 351.7 | 114.8 | 25.9 | 351.6 | 73.9 |
| 42.7 | 439.6 | 97.3 | 27.4 | 439.6 | 62.2 |
| 46.2 | 527.5 | 87.5 | 30.1 | 527.5 | 57.1 |
| 47.9 | 615.4 | 77.8 | 39.3 | 615.4 | 63.9 |
| 49.6 | 703.3 | 70.5 | 44.5 | 703.3 | 63.2 |
| 56.4 | 791.2 | 71.3 | 53.0 | 791.2 | 66.9 |
| 64.9 | 879.1 | 73.9 | 64.9 | 879.1 | 73.9 |
| Decreasing Shear | | | Decreasing Shear | | |
| 13.7 | 0 | Yield Point | 6.8 | 0 | Yield Point |
| 23.9 | 87.9 | 272.3 | 15.4 | 87.9 | 175.1 |
| 28.0 | 175.8 | 159.5 | 18.8 | 175.8 | 106.9 |
| 31.8 | 263.7 | 120.6 | 21.5 | 263.7 | 81.7 |
| 34.2 | 351.6 | 97.3 | 23.9 | 351.6 | 68.1 |
| 36.2 | 439.6 | 82.5 | 25.6 | 439.6 | 58.4 |
| 38.9 | 527.5 | 73.9 | 28.4 | 527.5 | 53.8 |
| 42.8 | 615.4 | 69.5 | 35.9 | 615.4 | 58.4 |
| 47.8 | 703.3 | 68.1 | 42.75 | 703.3 | 60.8 |
| 54.7 | 791.2 | 69.2 | 53.0 | 791.2 | 66.9 |
| 65.0 | 879.1 | 73.9 | 64.9 | 879.1 | 73.9 |

TABLE 4

60 MINUTE SLUDGE HEAT TREATMENT EFFECT UPON SLUDGE VISCOSITY

| Raw Digested Sludge | | | Heat Treated Sludge | | |
|---|---|---|---|---|---|
| Shear Stress (Pascals) | Shear Rate (Sec$^{-1}$) | Viscosity (CP) | Shear Stress (Pascals) | Shear Rate (Sec$^{-1}$) | Viscosity (CP) |
| Increasing Shear | | | Increasing Shear | | |
| 14.2 | 0 | Yield Point | 4.2 | 0 | Yield Point |
| 17.6 | 44 | 339.7 | 7.5 | 44 | 171.3 |
| 20.1 | 88 | 228.4 | 9.2 | 88 | 104.7 |
| 21.9 | 132 | 166.2 | 10.1 | 132 | 76.2 |
| 23.6 | 176 | 134.2 | 10.6 | 176 | 59.9 |
| 24.8 | 220 | 112.9 | 11.2 | 220 | 51.0 |
| 26.1 | 264 | 98.9 | 11.7 | 264 | 44.4 |
| 27.1 | 308 | 88.1 | 12.2 | 308 | 39.7 |
| 27.9 | 352 | 79.5 | 12.6 | 352 | 35.7 |
| 28.8 | 396 | 72.7 | 13.1 | 396 | 32.9 |
| 29.8 | 440 | 67.8 | 14.1 | 440 | 31.9 |
| Decreasing Shear | | | Decreasing Shear | | |
| 10.1 | 0 | Yield Point | 2.3 | 0 | Yield Point |
| 15.3 | 44 | 347.2 | 5.2 | 44 | 113.0 |
| 18.5 | 88 | 209.4 | 6.5 | 88 | 74.2 |
| 20.1 | 132 | 152.3 | 7.5 | 132 | 57.1 |
| 22.1 | 176 | 125.8 | 8.4 | 176 | 47.6 |
| 23.6 | 220 | 107.4 | 9.2 | 220 | 41.9 |
| 24.8 | 264 | 93.9 | 10.1 | 264 | 38.1 |
| 26.1 | 308 | 84.8 | 10.7 | 308 | 34.8 |
| 27.1 | 352 | 77.1 | 11.5 | 352 | 32.5 |
| 28.3 | 396 | 71.5 | 12.2 | 396 | 30.9 |
| 29.1 | 440 | 66.2 | 14.1 | 440 | 31.9 |

TABLE 5

60 MINUTE SLUDGE HEAT TREATMENT EFFECT UPON 50:50 SLUDGE/COAL MIXTURE VISCOSITY

| Raw Digested Sludge/Coal Mixture | | | Heat Treated Sludge/Coal Mixture | | |
|---|---|---|---|---|---|
| Shear Stress (Pascals) | Shear Rate (Sec$^{-1}$) | Viscosity (CP) | Shear Stress (Pascals) | Shear Rate (Sec$^{-1}$) | Viscosity (CP) |
| Increasing Shear | | | Increasing Shear | | |
| 285 | 0 | Yield Point | 134 | 0 | Yield Point |
| 147 | 39 | 3779 | 131 | 39 | 3350 |
| 154 | 78 | 1975 | 158 | 78 | 2019 |
| 167 | 117 | 1431 | 176 | 117 | 1503 |
| 190 | 156 | 1224 | 184 | 156 | 1181 |
| 201 | 195 | 1030 | 191 | 195 | 979 |
| 210 | 234 | 899 | 191 | 234 | 816 |
| 214 | 273 | 785 | 189 | 273 | 693 |
| 218 | 312 | 697 | 186 | 312 | 596 |
| 219 | 351 | 625 | 183 | 351 | 521 |
| 221 | 390 | 567 | 178 | 390 | 456 |
| Decreasing Shear | | | Decreasing Shear | | |
| 27.0 | 0 | Yield Point | 16.8 | 0 | Yield Point |
| 50.3 | 39 | 1288 | 33.5 | 39 | 858 |
| 63.7 | 78 | 816 | 46.9 | 78 | 601 |
| 74.4 | 117 | 635 | 56.3 | 117 | 481 |
| 86.4 | 156 | 554 | 64.3 | 156 | 412 |
| 95.1 | 195 | 488 | 71.0 | 195 | 364 |
| 103.8 | 234 | 443 | 75.4 | 234 | 322 |
| 112.2 | 273 | 411 | 80.4 | 273 | 295 |
| 118.9 | 312 | 381 | 85.4 | 312 | 274 |
| 125.6 | 351 | 358 | 90.5 | 351 | 258 |
| 134.0 | 390 | 344 | 95.5 | 390 | 245 |

It can be demonstrated that the viscosity of a slurry mixture is related to the viscosity of the base liquid according to the equation:

$$\frac{u_m}{u_b} = \Phi(\phi, \psi)$$

where
$u_m$ = mixture viscosity
$u_b$ = base liquid viscosity
$\phi$ = solids volume fraction
$\psi$ = particle shapes Thus, assuming that for two respective samples the solids volume fraction and the particulate solid shape remain the same, the viscosity of the mixture can be reduced by lowering the viscosity of the base liquid. A 40 percent reduction in the viscosity of the sewage sludge should accordingly result in a 40 percent reduction in the viscosity of the fuel composition in which the sewage sludge comprises the base liquid. For example, untreated sludge exhibiting a viscosity of approximately 100 cp can be heat treated to lower the viscosity of the sludge to approximately 60 cp.

Figure 4:
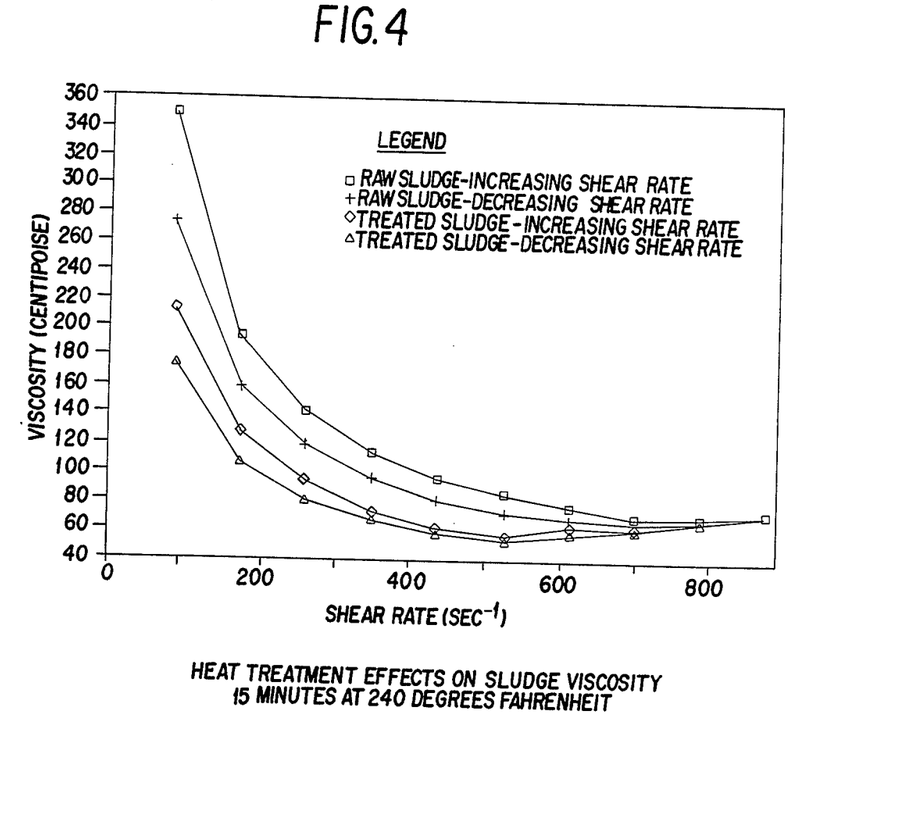
FIG. 4 comprises a viscosity diagram for both heat treated (15 minutes) and non-heat treated sewage sludge at saturated steam temperature (approximately 240° F.) and a pressure of 11 psig.

Table 3 and FIG. 4 represent the actual effects of the heat treatment of digested sewage sludge for fifteen (15) minutes. Before heat treatment, the sample exhibited an initial yield point of 23.9 Pascals and after a few minutes of increasing and decreasing shear rates, showed a final yield point of 13.7 Pascals. The heat treated sample, however, exhibited a decreased initial yield point of 11.9 Pascals and a final yield of 6.8 Pascals representing a greater than 50% reduction in yield points upon fifteen minutes of heat treatment.

Also shown in Table 3 and FIG. 4 are the apparent viscosities of the sludge before and after heat treatment. The data indicates that the material behaves as a Bingham plastic and is thixotropic. The data also indicates that after heat treatment not only are the apparent viscosities lower with increasing and decreasing shear rates, but also that as the material is subjected to heat treatment, less thixotropy results. This lowering in thixotropy is indicated by the smaller distance between the increasing shear rate curve and the decreasing shear rate curve. It is also interesting to note with these two samples, that at high shear rates (i.e., at 879.1 sec$^{-1}$) the apparent viscosities of both the treated and untreated samples are the same at 73.9 centipoise. This trend may indicate that the effect of heat treatment is strictly the lowering of the plastic yield point and that a limit exists with regard to how far heat treatment can lower the overall viscosity of the sludge. For example, further heat treatment may lower the yield point to zero, but the overall viscosity of the mixture may become Newtonian and exhibit an apparent viscosity on the order of 73.9 centipoise for this sample.

Figure 5:
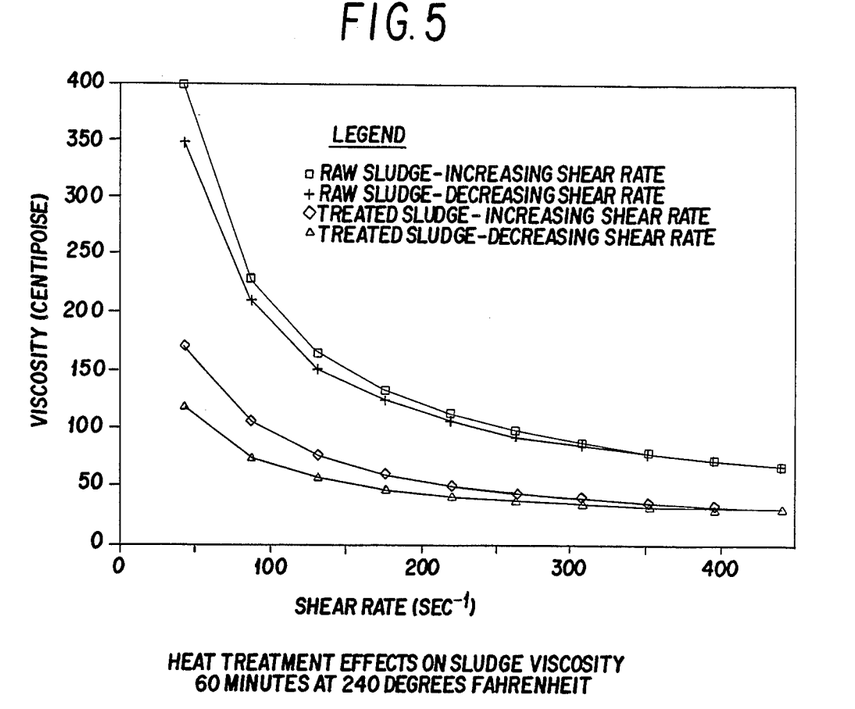
FIG. 5 comprises a viscosity diagram for both heat treated (60 minutes) and non-heat treated sewage sludge at saturated steam temperature (approximately 240° F.) and a pressure of 11 psig.

Table 4 and FIG. 5 depict the test results relating to the rheological properties of sludge before and after heat treatment for sixty (60) minutes. This analysis was performed with a different sensor system in the Haake RV2 rotoviscometer to obtain a more accurate analysis of the yield point and viscosity reduction with increased heat treatment. The data again demonstrates a reduction in initial yield points from 14.2 to 4.2 Pascals or a nearly 70% reduction. Final yield points were reduced from 10.1 to 2.3 Pascals (over a 75% reduction). At high shear rates (440 sec$^{-1}$) the one-hour heat treated sludge still exhibits a nearly 50% reduction in viscosity. That is, a viscosity of 31.9 centipoise with one-hour heat treatment compared to 66.2 centipoise without heat treatment. Because of the limitations of the instrument, higher shear rates (i.e., greater than 440 sec$^{-1}$) were not obtainable and thus a limiting value of viscosity was not shown in these tests. The data does indicate, however, that with one-hour heat treatment the apparent viscosity of the sludge mixtures at 32 centipoise is well below that as shown with the fifteen-hour heat treatment of 60–75 centipoise. In conclusion, the data indicates that with increasing time at a fixed temperatures and pressure, sludge properties of plastic yield point and apparent viscosity will decrease dramatically.

This suggests that with proper conditioning of sewage sludge by simply applying heat under pressure over a period of time, an ideal base fluid for coal-in-sludge mixtures can be tailored to fit a variety of fuel applications. Yield points can be lowered to provide ease of pumping of both sludge and coal/sludge mixtures from storage tanks. However, the existence of a yield point in a coal/sludge mixture is still beneficial from a stability point of view in that the yield point prevents the sedimentation of coal particles through the fluid mixture. This yield point also allows the lowering of coal concentrations in the mixture which may have beneficial effects in utilizing coarse coal grind consists or for applications where lower viscosities are desirable due to either pumping or burner limitations.

Figure 6:
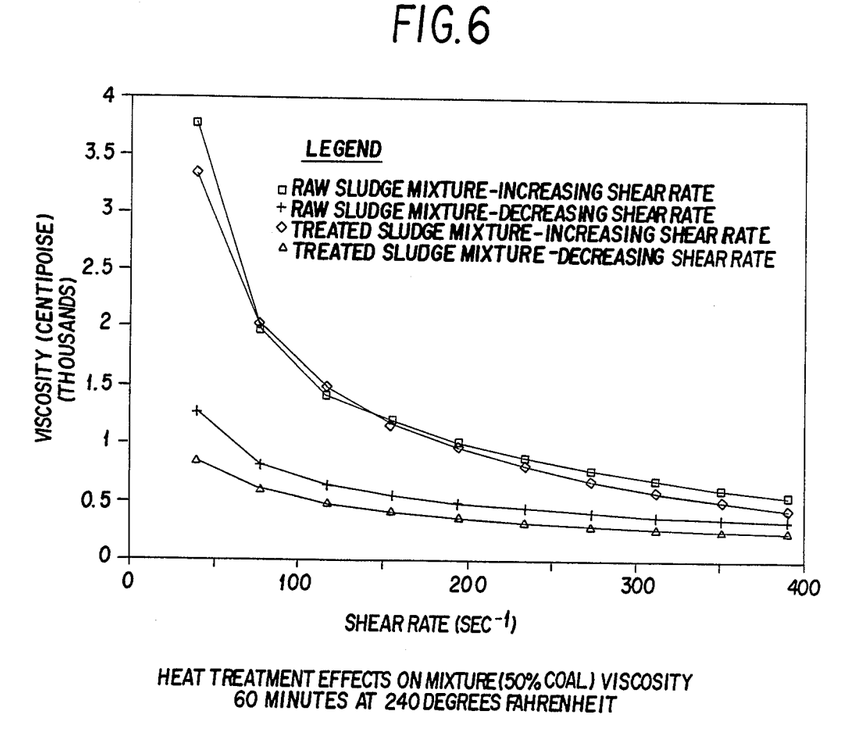
FIG. 6 comprises a viscosity diagram for a 50 percent by weight coal in both heat treated (60 minutes) and non-heat treated sewage sludge of 96.5 percent by weight water.

Table 5 and FIG. 6 correspondingly confirm that the above-discussed characteristics may be employed with advantage in connection with coal/sewage sludge admixtures as the initial and final yield points are reduced upon use of the heat treated sludge in the coal/sewage sludge admixtures as are the apparent viscosities exhibited by the admixture.

An additional advantage of the present invention relates to the stability of the resulting heat treated sewage sludge. It is apparent that the heat treatment of the sewage sludge destroys microorganisms present in the sludge. Such a result not only detoxifies the sludge but also reduces the production of gases (e.g., CO, $CO_2$, $H_2S$, $CH_4$) which undesirably affect the long term stability of the sewage sludge.

Figure 7:
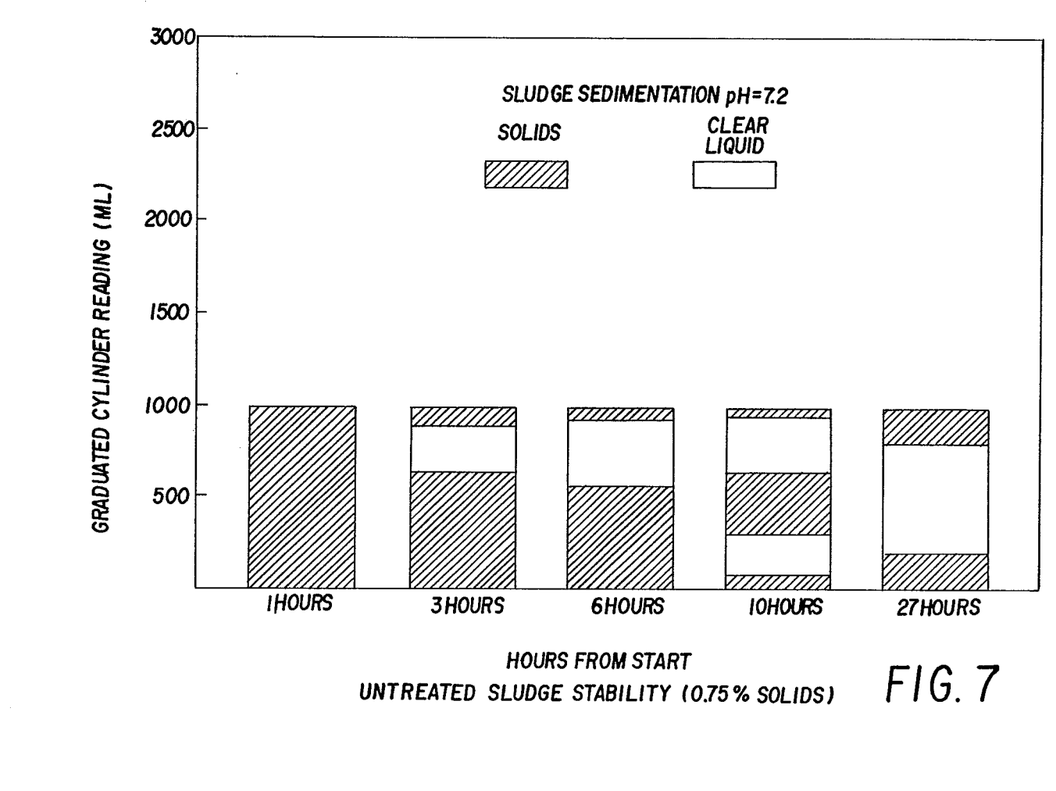
FIG. 7 graphically depicts the long term instability of a sewage-sludge composition comprised of non-heat treated sewage sludge.

For example, FIG. 7 graphically depicts the long-term stability characteristics of an untreated sewage sludge composition comprised of 0.75 percent by weight solids. The Figure clearly indicates that significant stratification results over a 27 hour period, with such stratification beginning to occur within hours of the sludge being permitted to settle. The different zones depicted in the Figure (representing clear liquid and sludge solids) are the result of the tendency of certain of the solids to float and the tendency of certain of the solids to settle. The gases generated during the decomposition of the sludge with time have been found to hasten the stratification of the sludge solids. Lessened production of such gases will accordingly assist in the providing of a more stable sluge composition.

The concentration of solids in the sewage sludge is not critical as long as the solids content is maintained within the range of from about 2 to 10 percent by weight. Depending upon whether the solids concentration is relatively high or low, the concentration of the solid fuel in the fuel admixture can be increased or reduced to accommodate the change in concentration of the sludge solids. The important aspect with respect to the solid fuel in liquid mixture ratios is the pumpability of the admixture. Mixtures which exhibit very high viscosity characteristics become impractical to transport via pumping because of high pressure drop in the pipeline, or in the extreme, complete inability to move the mixture by pumping. Desirable proportions of the solid fuel to the sewage sludge thus will generally range from about 45/55 to about 75/25 depending on the tested viscosity characteristics of specific solid fuels and sludges.

One of the most important advantages of the present invention is that an increased solids loading can be obtained without an unacceptable increase in the viscosity characteristics of the admixture due to the modification of the viscosity of the sewage sludge by the heat treatment of the sewage sludge. That is, the heat treated sewage sludge will exhibit an extremely high viscosity at rest (which assists in maintaining the stability of the fuel composition over the long term) and exhibit a lesser viscosity and thus less resistance when pumped. The fact that less resistance to of pumping exists enables a higher solids loading to be achieved than would normally be the case.

By way of example, the particulate fuel-sewage sludge admixture may advantageously comprise from about 45 to 75 percent by weight particulate fuel, from about 1 to 5 percent by weight sewage sludge solids, and from about 20 to 54 percent by weight moisture. A specific exemplary composition comprises 58 percent by weight coal solids, 2 percent by weight sludge solids (based on a sewage sludge comprised of 5 percent sludge solids), and 40 percent by weight of moisture.

The combustible fuel admixture may be formed by admixing the heat treated sewage sludge with the particulate solid fuel in suitable proportions. The respective components are desirably admixed thoroughly by suitable means such as agitation to ensure that the particulate solid fuel is well dispersed within the sewage sludge. A thorough admixing of the solid fuel within the sludge minimizes settling of the solid fuel and enables the admixture to be pumped without unnecessary difficulty.

Figure 8:
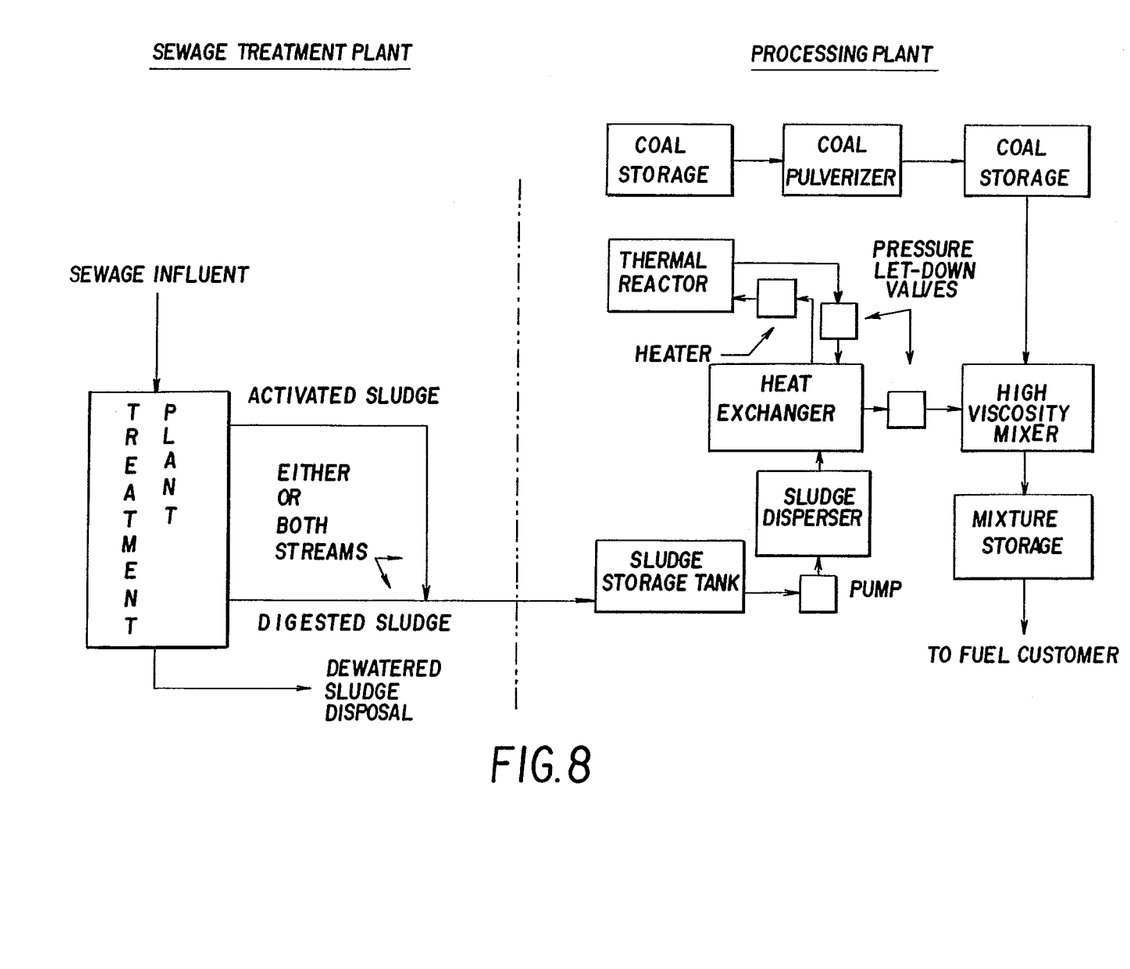
FIG. 8 depicts schematically a method for the production of a fuel composition according to the method of the present invention.

A simplified flowsheet depicting the manufacture of a coal-sludge mixture according to the present invention is provided in FIG. 8. The flowsheet starts at the sewage treatment plant where activated and/or digested sludge streams are produced in a conventional manner. As such streams can typically contain less than 2 percent by weight solids, a partial dewatering step (i.e., a centrifuge, etc.) may be employed to increase the solids content of such sludge streams to at least about 2 percent by weight. The sludge is then transported to the processing plant by pipeline, truck, barge, etc. At the plant the sludge is stored in a storage tank until it is ready for processing.

From the storage tank the sewage sludge passes through a continuous or semi-batch process consisting of pressure vessels where the sludge is heat-treated under pressure (optionally in contact with saturated steam). The pressure is selected to be near the steam saturation pressure to ensure there is no increase or decrease in the water content of the sludge. The residence time of the sludge in the heat-treatment zone depends on the amount of viscosity reduction desired and the actual operating conditions. As noted above, a 35 to 70 percent viscosity reducton can be achieved in 15 to 60 minutes at about 240° F. and 11 psig.

From the study storage tank, the sewage sludge is "delumped" by means of an in-line disperser. A recuperative heat exchanger is used to both heat the untreated sludge and cool the treated sludge in improved process economics. The final mixture is pumped to a fuel tank for customer shipment or recycled to improve fuel product quality.

While the above-described method focuses upon the heat treatment of the sewage sludge prior to admixture with pulverized solid fuel, the objects of the present invention may still be obtained if the sewage sludge is subjected to heat treatment subsequent to admixture with the solid fuel. However, such an alternative method of operation is not preferred as it requires that greater amounts of heat be employed (due to an increased solids mass) as well as large treatment vessels. It is thus preferred that the sewage sludge component be heat treated separately and subsequently admixed with the particulate solid fuel.

The solid fuel will generally by easily maintained in suspension within the sewage sludge due to the physical composition and viscosity of the sludge. It may, however, be advantageous to add various additives to the fuel admixture to further enhance the dispersal of the solid fuel within the sludge. The use of such additives with coal-water slurries is conventional and various types of additives may be employed. See, for example, U.S. Pat. No. 3,542,682 (issued to Booth) and U.S. Pat. No. 4,242,098 (issued to Braun et al), each incorporated herein by reference in its entirety.

The combustible fuel admixture of the present invention can be utilized as a fuel source for a variety of applications such as boilers which are employed in the generation of electrical power. The fuel can be directly substituted for conventional coal-water or coal-oil slurry fuels or admixed therewith in various proportions. The sewage sludge is incinerated substantially completely during the combustion process which enables the combustion of the fuel admixture to serve as a viable disposal method for sewage sludge.

A comparative heating value analysis of coal-water, coal-sludge, and a typical coal-oil mixture is shown in Table 6. As can be seen from the tabulation, the coal-sludge fuel of the present invention is less than coal-water fuel in terms of heating value. However, because of the elimination of additives in coal-sludge mixtures, the cost of the fuel per unit of heating value is less. Coal-oil fuels will exhibit much higher heating values in comparison to the coal-sludge and coal-water fuels due to the significant heating value of the oil. The coal-sludge and coal-water fuels should produce lower $NO_x$ values during combustion in comparison to coal-oil fuels, assuming like conditions, since the flame temperature will be lower than the coal-oil mixtures due to the addition of the non-fuel (i.e., water) and high heat of vaporization of the water contained therein.

TABLE 6

| FUEL | WEIGHT FRACTION | GROSS HEATING VALUE BTU/LB | GROSS HEATING VALUE BTU/LB |
|---|---|---|---|
| A. Coal-Sludge: | | | |
| Sludge Solids | 0.02 | 7,250.0 | 145.0 |
| Sewage Water | 0.40 | 1.7 | 0.7 |
| Coal | 0.58 | 12,545.0 | 7276.1 |
| TOTAL | 1.00 | | 7421.8 |
| B. Coal-Water: | | | |
| Additives | 0.01 | 0.0 | 0.0 |
| Water | 0.29 | 0.0 | 0.0 |
| Coal | 0.70 | 12,545.0 | 8781.5 |
| TOTAL | 1.00 | | 8781.5 |
| C. Coal-Oil: | | | |
| Oil | 0.50 | 18,080.0 | 9,040.0 |
| Coal | 0.50 | 12,545.0 | 6,272.5 |
| TOTAL | 1.00 | | 15,312.5 |

COMPARATIVE GROSS HEATING VALUE FUEL ANALYSIS

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In a pumpable fuel composition comprising from about 45 to 75 percent by weight of a particulate solid fuel and from about 25 to 55 percent by weight of sewage sludge, the improvement wherein said sewage sludge comprises from about 90 to 98 percent by weight of water and which sewage sludge has been subjected to heat treatment for a period of time ranging from about 5 to 120 minutes at a temperature in the range of from about 150° to 500° F. while being maintained at a first pressure within the range of from 5 to 700 psig sufficient to maintain the water content of the heat treated sewage sludge in the range of from about 90 to 98 percent by weight, said first pressure at which said sewage sludge is maintained being reduced to a second pressure without permitting significant cooling of the heat treated sewage sludge, said pressure differential between said first and second pressures being in the range of from 5 to 20 psi and said heat treated sewage sludge being maintained at a temperature during said pressure reduction sufficient to lower the viscosity exhibited by said heat treated sewage sludge at ambient conditions in comparison to that exhibited by the sewage sludge prior to said heat treatment.

2. The fuel composition of claim 1 wherein the sewage sludge comprises from about 92 to 97 percent by weight of water.

3. The fuel composition of claim 1 wherein said particulate solid fuel is selected from the group consisting of coal, petroleum coke, by-product coke, charcoal, humate, peat, wood and mixtures thereof.

4. The fuel composition of claim 3 wherein said particulate solid fuel is coal.

5. The fuel composition of claim 1 wherein said sewage sludge is heat treated in the presence of steam.

6. The fuel composition of claim 1 wherein said sewage sludge is heat treated for a period of time of from about 15 to 60 minutes.

7. The fuel composition of claim 1 wherein said sewage sludge is heat treated for a period of time and said pressure differential is of such magnitude to effect a viscosity reduction of at least about 40 percent when measured at ambient temperature and a shear rate of 100 sec$^{-1}$.

8. The fuel composition of claim 1 wherein said sewage sludge is subjected to heat treatment at a temperature in the range of from about 200° to 500° F.

9. The fuel composition of claim 8 wherein said sewage sludge is subjected to heat treatment at a temperature in the range of from about 220° to 300° F.

10. The fuel composition of claim 1 wherein said first pressure ranges from about 5 to 20 psig.

11. In a method for the production of an improved pumpable fuel composition comprising from about 45 to 75 percent by weight of a particulate solid fuel and from about 25 to 55 percent by weight of sewage sludge, the improvement comprising (1) subjecting said sewage sludge which comprises from about 90 to 98 percent by weight of water to a heat treatment for a period of time ranging from about 5 to 120 minutes at a temperature in the range of from about 150° to 500° F. while maintaining said sewage sludge at a first pressure within the range of from 5 to 700 psig sufficient to maintain the water content of the heat treated sewage sludge within the range of from about 90 to 98 percent by weight for a time sufficient to increase the vapor pressure of the water contained within the sewage sludge, and (2) reducing the pressure at which said sewage sludge is maintained from said first pressure to a second pressure without permitting significant cooling of the heat treated sewage sludge, the pressure differential between said first and second pressures being in the range of from 5 to 20 psi and said heat treated sewage sludge being maintained at a temperature during said pressure reduction sufficient to lower the viscosity exhibited by said heat treated sewage sludge at ambient conditions in comparison to that exhibited by the sewage sludge prior to said heat treatment.

12. The method of claim 11 wherein the sewage sludge comprises from about 92 to 97 by weight of water.

13. The method of claim 11 wherein said particulate solid fuel is selected from the group consisting of coal, petroleum coke, by-product coke, charcoal, humate, peat, wood and mixtures thereof.

14. The method of claim 13 wherein said particulate solid fuel is coal.

15. The method of claim 11 wherein said sewage sludge is heat treated in the presence of steam.

16. The method of claim 11 wherein said sewage sludge is heat treated for a period of time of from about 15 to 60 minutes.

17. The method of claim 11 wherein said sewage sludge is heat treated for a period of time sufficient to effect a vicosity reduction of at least about 40 percent when measured at ambient temperature and at a shear rate of 100 sec$^{-1}$.

18. The method of claim 11 wherein said sewage sludge is subjected to heat treatment at a temperature in the range of from about 200° to 500° F.

19. The method of claim 11 wherein said sewage sludge is subjected to heat treatment at a temperature in the range of from about 220° to 300° F.

20. The method of claim 11 wherein said first pressure ranges from about 5 to 20 psig.

* * * * *